United States Patent
Lin et al.

(10) Patent No.: US 7,986,368 B2
(45) Date of Patent: Jul. 26, 2011

(54) DIGITAL PHOTO FRAME WITH PHOTOGRAPHING FUNCTION

(75) Inventors: Lien-Chen Lin, Jhubei (TW); Ping-Fu Cheng, Taipei (TW); Chen-Loon Chang, Taipei (TW)

(73) Assignee: Aiptek International Inc (TW)

( * ) Notice: Subject to any disclaimer, the term of this patent is extended or adjusted under 35 U.S.C. 154(b) by 918 days.

(21) Appl. No.: 11/985,226

(22) Filed: Nov. 14, 2007

(65) Prior Publication Data

US 2009/0059052 A1 Mar. 5, 2009

(30) Foreign Application Priority Data

Aug. 30, 2007 (TW) .............................. 96214465 U

(51) Int. Cl.
  *H04N 5/225* (2006.01)
  *H04N 5/253* (2006.01)
  *H04N 5/222* (2006.01)
  *G03B 13/02* (2006.01)
  *H02B 1/00* (2006.01)
  *H05K 7/00* (2006.01)
  *H05K 5/00* (2006.01)

(52) U.S. Cl. ...................... 348/373; 348/96; 348/333.01; 348/333.11; 348/374; 348/376; 396/373; 396/374; 361/600; 361/679.01; 361/679.02

(58) Field of Classification Search .................... 348/96, 348/333.01, 373–376; 361/600, 679.02–679.6
See application file for complete search history.

(56) References Cited

U.S. PATENT DOCUMENTS

| | | | | |
|---|---|---|---|---|
| 6,441,828 | B1 * | 8/2002 | Oba et al. ...................... | 345/659 |
| 6,590,764 | B2 * | 7/2003 | Silverstein ............... | 361/679.56 |
| 6,961,046 | B2 * | 11/2005 | Bowden et al. ................ | 345/104 |
| 6,975,308 | B1 * | 12/2005 | Bitetto et al. ................. | 345/204 |
| 7,852,403 | B2 * | 12/2010 | Tsai et al. ...................... | 348/375 |
| 2003/0133013 | A1 * | 7/2003 | Maeda et al. .................. | 348/143 |
| 2005/0073155 | A1 * | 4/2005 | Weng ........................... | 292/138 |
| 2005/0162711 | A1 * | 7/2005 | Wu ............................... | 358/474 |
| 2006/0044399 | A1 * | 3/2006 | Fredlund et al. .......... | 348/207.99 |
| 2007/0285561 | A1 * | 12/2007 | Chen ............................. | 348/373 |
| 2008/0143890 | A1 * | 6/2008 | Rosencwaig et al. ......... | 348/836 |
| 2008/0225172 | A1 * | 9/2008 | Chen ............................. | 348/569 |

* cited by examiner

*Primary Examiner* — Jason Chan
*Assistant Examiner* — Michael Osinski

(57) ABSTRACT

A digital photo frame with photographing function includes a digital frame, a lens module, a bracket, and a copy stand. The digital frame may further include a display module, a frame, a memory module, a control module, an input module, a power supply module, and a sense module. The display module is framed within the frame, and the lens module is disposed at a predetermined location on the frame. A paper photo can be disposed on the copy stand that is pivotally connected to the bracket. The input module can input a control signal to operate and control the lens module to copy photograph the paper photo into a digital photo and store the digital photo in the memory module and further display the digital photo on the display module.

16 Claims, 9 Drawing Sheets

DIGITAL PHOTO FRAME WITH PHOTOGRAPHING FUNCTION

BACKGROUND OF INVENTION

1. Field of the Invention

The present invention relates to digital photo frames with photographing function, and more particularly, to a digital photo frame that includes a lens module and a copy stand to enable the photo frame to directly display a photo acquired from self-photography or copy photography.

2. Description of the Prior Art

Rapid development in digital technology has brought traditional photography into a new digital era, which indicates a revolution in the photography industry as well as starts a fall of traditional film photography. At the same time, quick change in digital equipments greatly changes the design of some photo-related peripheral products.

A traditional photo frame can be adapted for photos that are developed from traditional films. The traditional photo frame frames the photo for the purpose of maintaining the integrity of the photo and preventing the photo from fading by a protective glass thereof and displaying the photo through the protective glass. However, one photo frame can only display one photo at one time. To accommodate multiple valuable photos, either an enlarged photo frame or multiple photo frames are required. As currently the digital camera has come into use, it drives the versatile designs in peripheral devices for storing the photos, and accordingly different electronic photo frames have been developed for displaying digital photo data.

To convert the traditional photo into digital data for permanent preservation, digital copy photograph or digital scanning is firstly required to record the original photo in an image file format in a memory or magnetic disk. Then, the image file is transmitted to the electronic photo frame via a wire or wireless transmission, allowing the image to be displayed on the electronic photo frame to provide appreciation. In this process, the photographing or scanning equipments may be unduly complex, and the time for transmitting the image file may be unduly long. Therefore, the paper photo cannot be readily and quickly converted into a digital photo to be displayed on the electronic photo frame using the prior technology.

SUMMARY OF INVENTION

Accordingly, the present invention is directed to a digital photo frame with photographing function that generally includes a lens module and a copy stand. The copy stand may support a paper photo. The lens module may photograph the paper photo supported on the copy stand. After the photographed photo is converted into a digital photo, the digital photo is displayed on the display module, thus achieving copy photograph of the paper photo.

The present invention is also directed to a digital photo frame with photographing function that includes a wireless receiving module to cooperate with a remote controller to receive a control signal, thereby remotely controlling the digital photo frame to take photograph or change the photos being displayed.

One embodiment of the digital photo frame in accordance with the present invention comprises a digital frame, a lens module, a bracket, and a copy stand. The digital frame may further include a display module, a frame, a memory module, a control module, an input module, a power supply module, and a sense module. The display module is framed within the frame, and the lens module is disposed at a predetermined location on the frame. A paper photo can be disposed on the copy stand that is pivotally connected to the bracket. The input module can input a control signal to operate and control the lens module to copy photograph the paper photo into a digital photo and store the digital photo in the memory module and further display the digital photo on the display module.

Preferably, the digital photo frame of the present invention further comprises:

a display module configured to output the digital photo;

a frame framing the display module therein;

a memory module configured to store the digital photo taken by the lens module and supply the display module with digital photos for playback;

a control module configured to control the display module to display the digital photos and the lens module to take photographs;

an input module disposed at a predetermined location on the frame and being configured to input a control signal to operate the control module; and a power supply module configured to supply needed power to the digital frame.

Preferably, the lens module mainly comprises a plurality of lenses and an image sensor unit. The lens module is pivotally disposed in a lens module holder of the digital frame to provide photographs at different angles. The digital frame further comprises a sense module connected to the control module to sense an ambient environment to enable the control module to automatically control turning on or turn off of the power supply module. Wherein, the sense module employs one of light detection, audio detection, temperature detection, and infrared scan detection.

Preferably, the copy stand further comprises:

a connect portion comprising a first turning end, a second turning end, a slot, and an extension end, the first turning end being pivotally connected to the unfold portion of the bracket; and a support portion comprising a turning end and a pivot arm, in which the turning end of the support portion is pivotally connected to the second turning end of the connect portion and is pivotal about the second turning end for a preset angle with respect to the connect portion;

wherein the extension end can be pulled out of the slot of the connect portion so that the support portion and the lens module face each other and are spaced from each other for a preset distance and the pivot arm is configured for receiving a photo allowing the lens module to copy photograph the photo into a digital photo.

Preferably, the bracket and the copy stand are pivotally connected with each other, so that in a folded position, the bracket and copy stand are folded to be coplanar with each other and retract into a recess of the digital frame.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION

Figure 1:
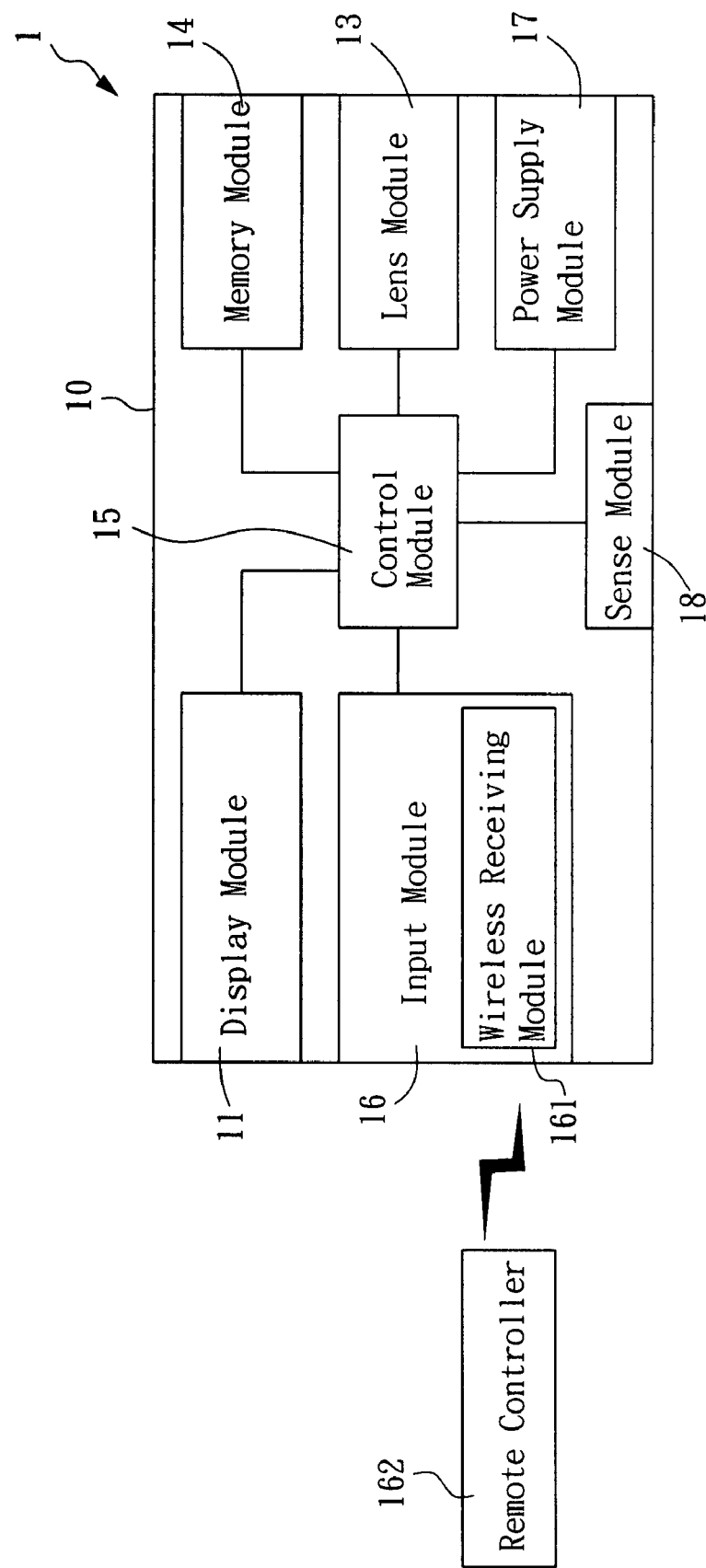
FIG. 1 is a system architecture of a digital photo frame with photographing function in accordance with the present invention.

FIG. 1 illustrates a system architecture of a digital photo frame with photographing function in accordance with the present invention. The digital photo frame 1 includes a digital frame 10 and a lens module 13. The digital frame 10 further includes a display module 11, a frame 12 (see FIG. 2A), a memory module 14, a control module 15, an input module 16, a power supply module 17, and a sense module 18. The input module 16 further includes a wireless receiving module 161 and a remote controller 162.

Figure 2A:
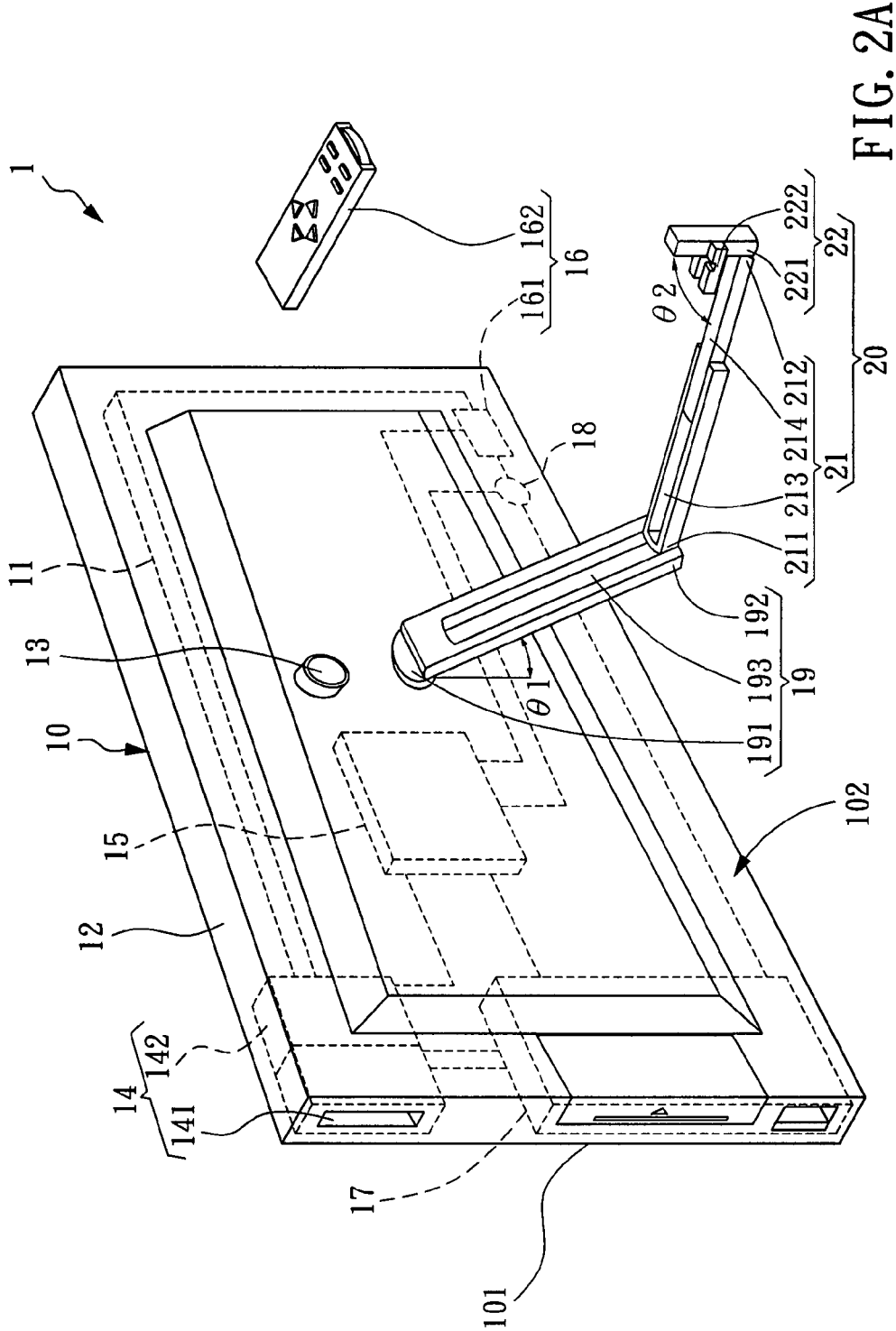
FIG. 2A is a rear perspective view of the digital photo frame in accordance with a first preferred embodiment of the present invention.
Figure 2B:
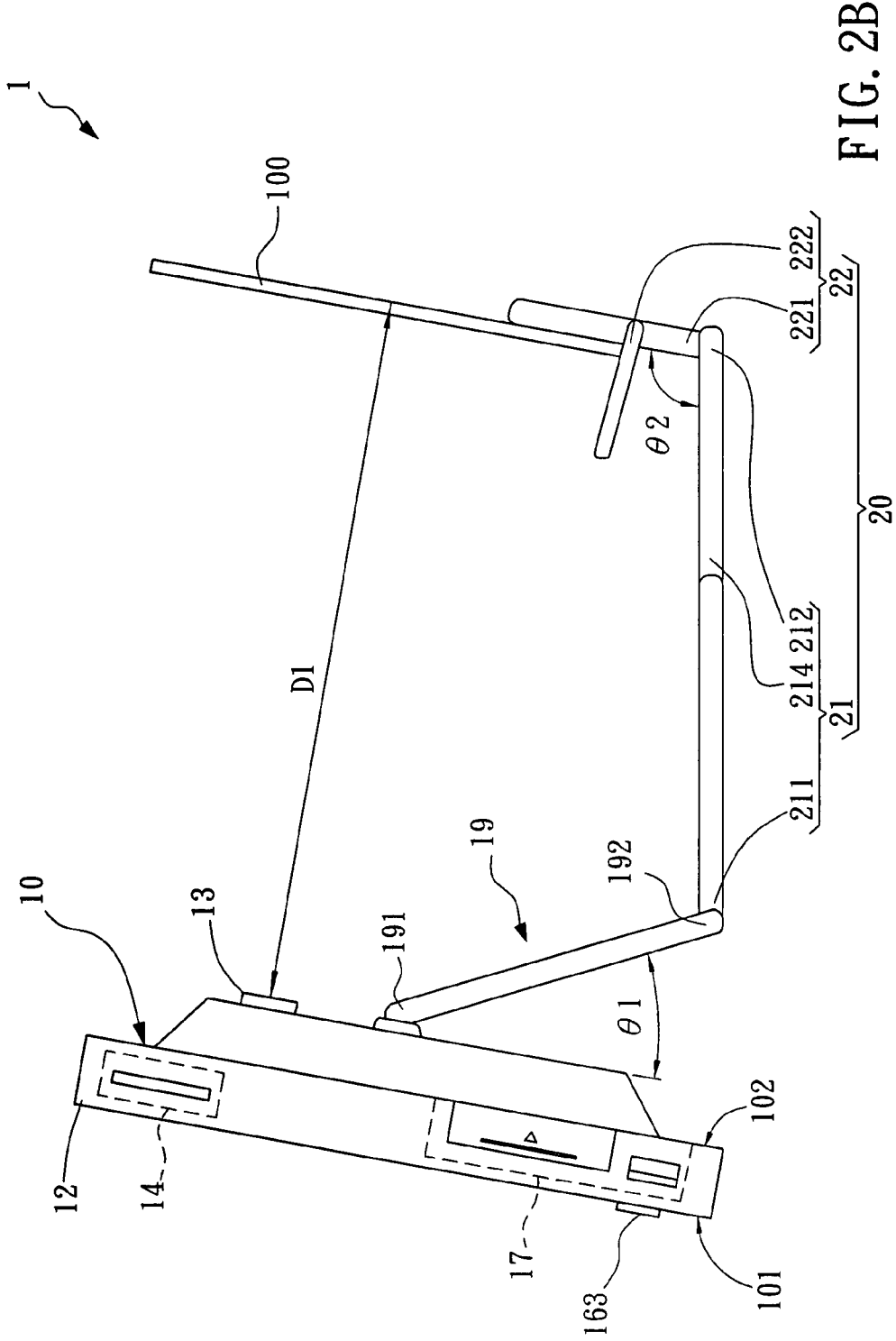
FIG. 2B is a side view of the digital photo frame in accordance with the first preferred embodiment of the present invention.

FIGS. 2A and 2B are a rear perspective view and a side view of the digital photo frame with photographing function in accordance with a first preferred embodiment of the invention, respectively. The display module 11 disposed on the frame 12 is framed within the frame 12 allowing digital photos to be displayed on a display surface 101 of the digital frame 10. The display module 11 may be a liquid crystal display (LCD).

The lens module 13 is disposed at a predetermined location on the frame 12 and mainly includes a plurality of lenses and an image sensor unit. The lens module 13 has zooming and auto focusing functions as well as light metering function to auto-adjust brightness and white balance parameters. In the first preferred embodiment of the invention, the lens module 13 is disposed on a back 102 of the frame 12, so that the back 102 can be used to take photograph of an external image, the display module 11 can be used as a viewfinder for taking digital photograph, and the digital photograph taken can be displayed on the display module 11. Since the above-described lens module 13 is commercially available, its construction is not described herein in further detail.

The memory module 14 is used to store the digital photographs taken by the lens module 13 and to supply the display module 11 with digital photographs to be displayed. The memory module 14 further includes a memory 141 and a memory card reader 142. The memory 141 may be one of a rewritable non-volatile memory, a flash memory, an erasable programmable read-only memory (EPROM), and a micro hard disk (Micro-HD).

The memory card reader 142 is compatible with memory cards of at lease one type of CF, MICRO DRIVE, SD, mini SD, MMC, RS-MMC, XD, MS, MS PRO, MS Duo, MS Duo pro, SM. Since the memory 141 and the memory card reader 142 are also commercially available and are not features of the present invention, their constructions are not described herein in further detail.

The control module 15 is used to control the display module 11 to display the digital photographs and control the lens module 13 to take photographs and store the photographs taken in the memory module 14. The wireless receiving module 161 of the input module 16 is disposed at a predetermined location on the frame 12 for receiving a control signal from the remote controller 162 so as to control the lens module 13 to photography through the control module 15 and change the photographs being displayed on the display module 11 in response to the control signal. In addition, the input module 16 may further include a button 163 (see FIG. 2B) disposed on an outer surface of the frame 12, which can be pressed to directly activate the photograph function of the lens module 13.

The wireless receiving module 161 may be one of a radio frequency (RF) module and an infrared (IR) module. The input module 16 disposed on the frame 12 may also be of a manual operation button type or an electronic touch panel type. Since the wireless receiving module 161 and the remote controller 162 are also commercially available and are not features of the present invention, their constructions are not described herein in further detail.

The power supply module 17 is used to supply needed power to the digital frame 10. The power supply module 17 may be one of a lithium battery, a nickel-metal hydride battery, an oxyride battery, a carbon-zinc battery, a nickel cadmium battery, a fuel battery, and a rechargeable battery. The power supply module 17 may also connect through one of a USB interface and a transformer to an outer power source to recharge the power supply module 17. Since the power supply module 17 is also commercially available and is not a feature of the present invention, its construction is not described herein in further detail.

The sense module 18 is disposed at a predetermined location on the frame 12, connected to the control module 15, and senses ambient environment to enable the control module 15 to auto operate and control the power supply module 17 to turn the digital frame 10 on or off, such that the digital frame 10 is automatically turned on when there are people around, and is automatically turned off to save power when there is not a person around. The sense module 18 may employ one of light detection, audio detection, temperature detection and infrared scan detection. Since the sense module 18 is also commercially available and is not feature of the present invention, its construction is not described herein in further detail.

The digital photo frame 1 further includes a bracket 19 and a copy stand 20. As shown in FIGS. 2A and 2B, the bracket 19 includes a pivot end 191, an unfold portion 192, and a receiving slot 193. The bracket 19 is attached to the back 102 of the digital frame 10 at the pivot end 191 and is pivoted about the pivot end 191 outward a preset angle θ1 with respect to the back 102 to support the digital frame 10. In this embodiment, the range of the angle θ1 is preferred ranging from 15 to 60 degrees. Since the bracket 19 and the copy stand 20 are pivotally connected with each other, in a folded position, the copy stand 20 is folded into the receiving slot 193 of the bracket 19 to be coplanar with the bracket 19.

The copy stand 20 may further include a connect portion 21 and a support portion 22. The connect portion 21 may include a first turning end 211, a second turning end 212, a slot 213, and an extension end 214. The first turning end 211 is connected to the unfold portion 192 of the bracket 19. The support portion 22 is pivotally connected to the second turning end 212. The extension end 214 can be pulled out of the slot 213 of the connection portion 21 to thereby adjust a distance between the support portion 22 and the lens module 13.

The support portion 22 may include a turning end 221 and a pivot arm 222. As shown in FIG. 2B, the turning end 221 is pivotally connected to the second turning end 212 of the connect portion 21 and pivoted about the second turning end 212 so that the turning end 221 and the extension end 214 form a preset angle θ2 therebetween, whereby the support portion 22 faces toward the display surface 101 of the digital frame 10 and is spaced a preset distance D1 from the lens module 13. The preset distance D1 and the preset angle θ2 are selected such that a paper photo 100 supported on the support portion 22 is positioned at the very location that enables the lens module 13 to take clear a photograph of the photo 100. In this embodiment, the photo 100 may be of 5×7 inches or 4×6 inches, and the range of the angle θ2 is preferred to be ranging from 80 to 135 degrees and the distance D1 is preferred to be ranging from 8 to 30 cm. The pivot arm 222 is pivotally connected to two opposite sides of the support portion 22, for receiving the photo 100 to be copy photographed by the lens module 13.

Figure 2C:
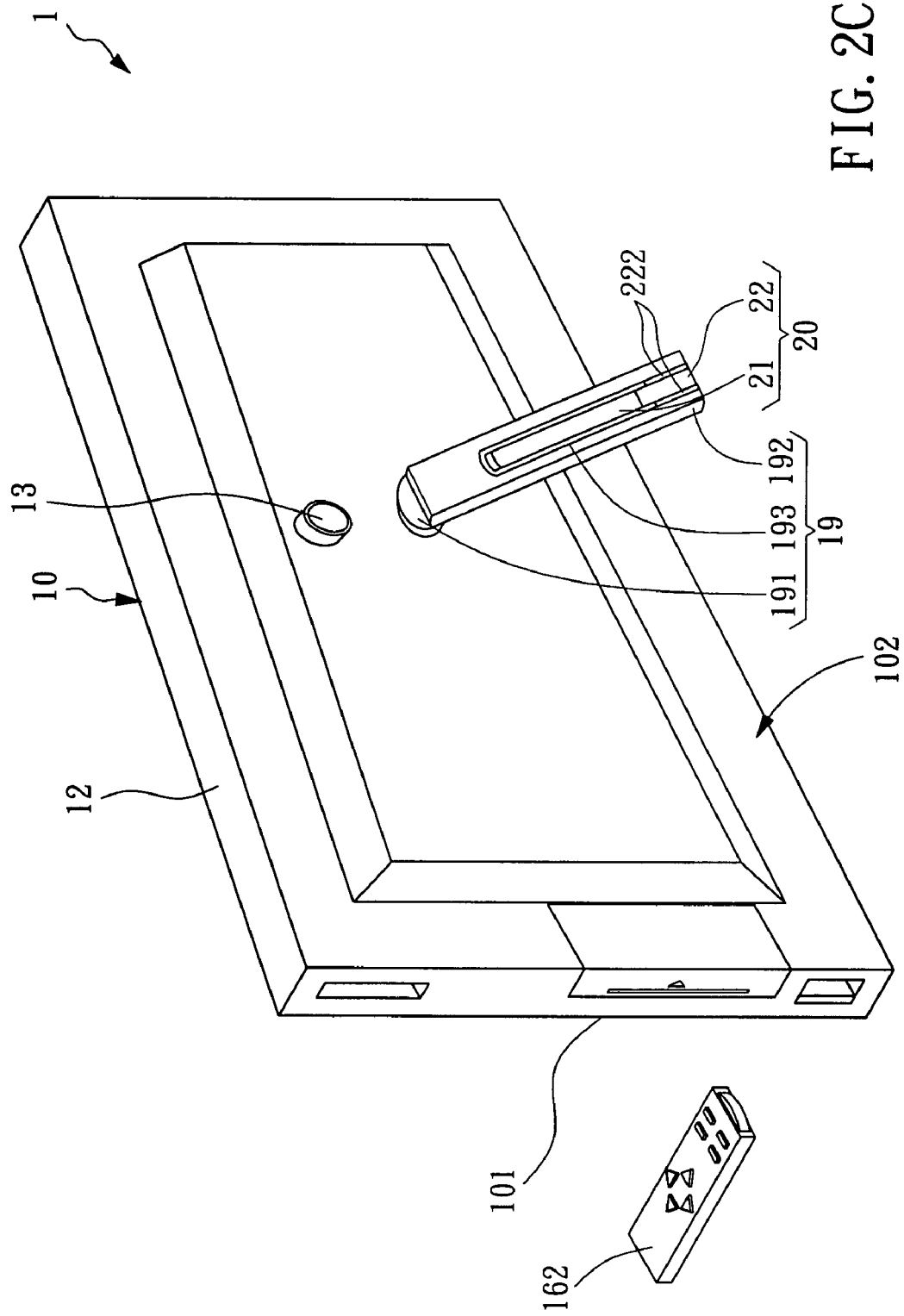
FIG. 2C is a folded position of the bracket of the digital photo frame in accordance with the first preferred embodiment of the present invention.

FIG. 2C illustrates a folded position of the bracket of the digital photo frame with photographing function of the first preferred embodiment. To fold the bracket, the two opposite pivot arms 222 are pivoted to be coplanar with the support portion 22. The support portion 22 is then pivoted to be coplanar with the extension end 214. The extension end 214 is moved into the slot 213 of the connect portion 21. Finally, the connect portion 21 is pivoted about the unfold portion 192 into the receiving slot 193 of the bracket 19, whereby the bracket 19 and the copy stand 20 are disposed in a fully folded position. Therefore, the bracket 19 can be folded for space-saving and visual elegance when not being used to copy photograph the photo 100.

In alternative embodiments of the present invention discussed below, a large part of elements are the same as or similar to those described in the previous embodiment and, therefore, it is noted that like elements and structures are not repeated herein and are given like names and denoted by like reference numerals, and similar elements are given like names but denoted by like reference numerals followed by a suffix of an English letter to shown differentiation.

Figure 3A:
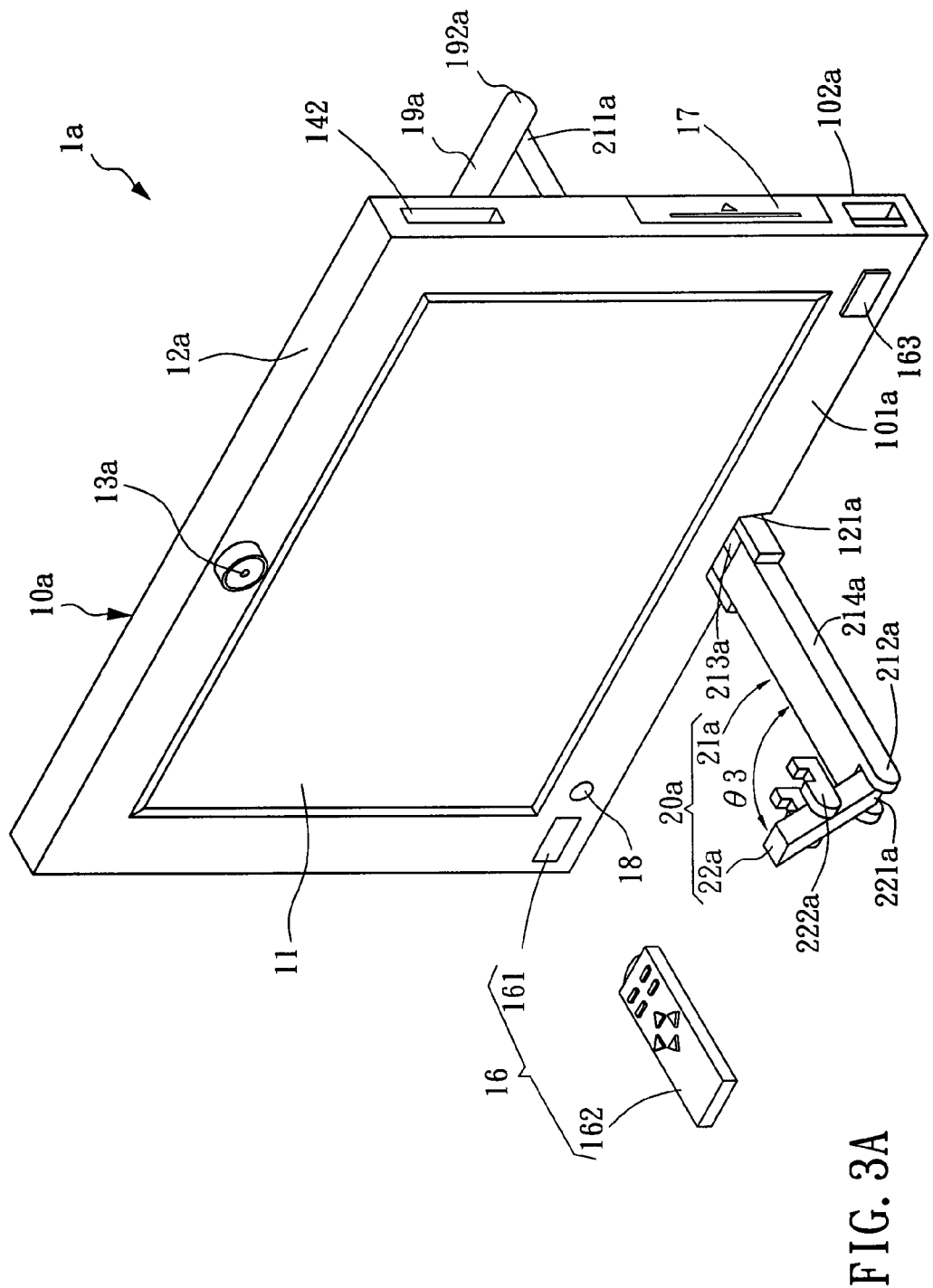
FIG. 3A is a front perspective view of a digital photo frame in accordance with a second preferred embodiment of the present invention.
Figure 3B:
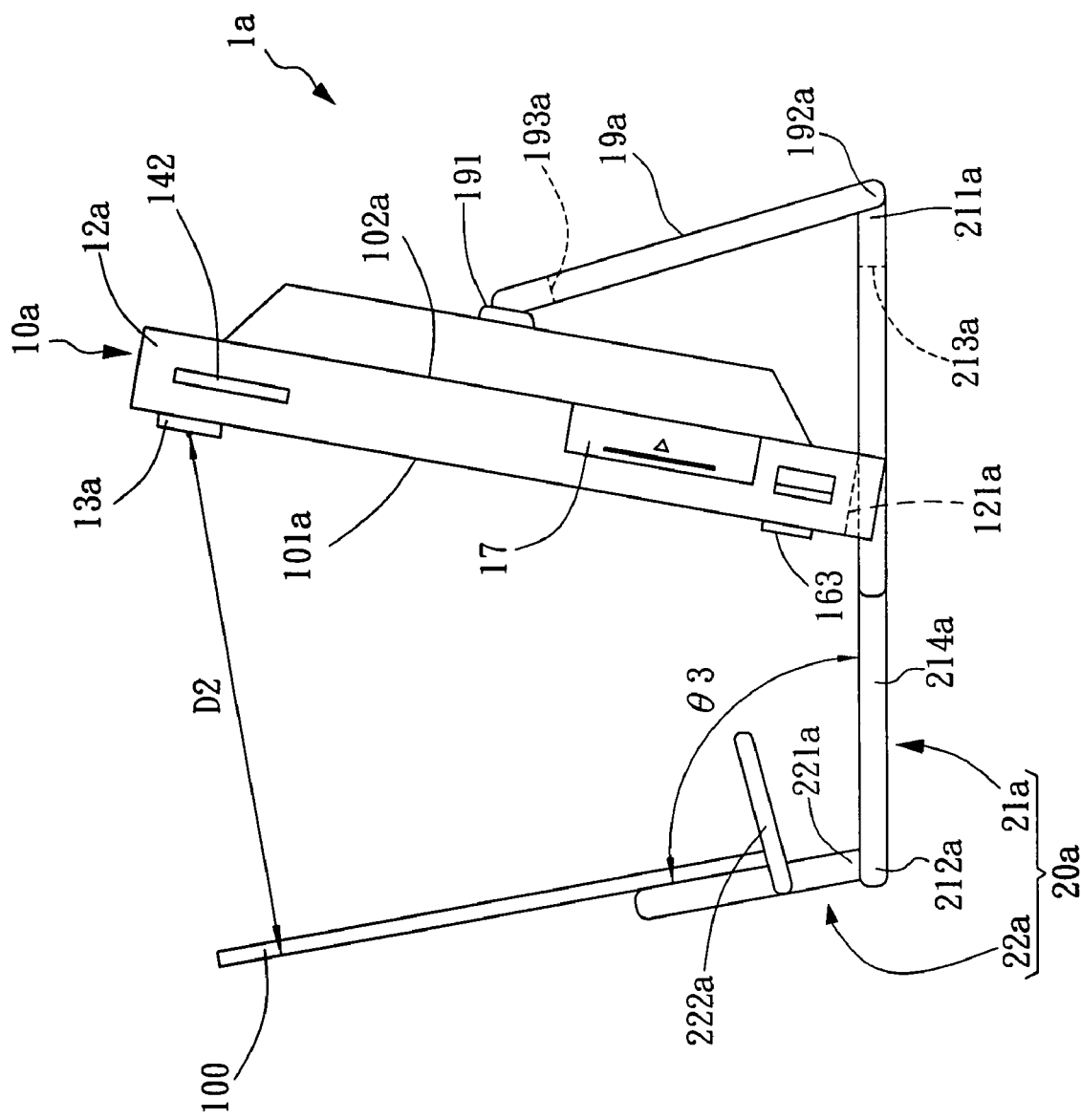
FIG. 3B is a side view of a digital photo frame in accordance with the second preferred embodiment of the present invention.

FIGS. 3A and 3B illustrate a front perspective view and a side view of a digital photo frame with photographing function in accordance with a second preferred embodiment of the invention, respectively. As shown in FIGS. 3A and 3B, the difference between the digital photo frame with photographing function of the second preferred embodiment and the first preferred embodiment is that, in the second preferred embodiment of the present invention, the lens module 13a of the digital photo frame 1a is disposed at a predetermined location on a front of the frame 12a on the display surface 101a, such that when operating the lens module 13a to self-photograph, the user does not need to rotate the digital photo frame 1a to face the back and can instantaneously view the self-photographed photo from the display module 11. Also, The connect portion 21a of the copy stand 20a is pivoted from the back 102a of the digital frame 10a toward the display surface 101a. In other words, the connect portion 21a is pivotally connected to the unfold portion 192a of the bracket 19a at the first turning end 211a. The copy stand 20a is pivoted about the first turning end 211a from the back 102a of the digital frame 10a toward the display surface 101a to extend across a recessed portion 121a on the frame 12a, with the connect portion 21a being received in the recessed portion 121a at an underside of the digital frame 10a. The extension portion 214a is pulled out of the slot 213a of the connect portion 21a and protrudes beyond the display surface 101a.

The turning end 221a of the support portion 22a is pivotally connected to the second turning end 212a of the connect portion 21a, and the support portion 22a is pivoted about the second turning end 212a so that the support portion 22a and the extension portion 214a form a preset angle θ3 therebetween, whereby the support portion 22a faces the display surface 101a of the digital frame 10a and is spaced a preset distance D2 from the lens module 13a. The paper photo 100 can be disposed on the pivot arm 222a of the support portion 22a for the lens module 13a to copy photograph the paper photo 100.

Since the bracket 19a and the copy stand 20a are pivotally connected with each other, during folding process, the two opposite pivot arms 222a are pivoted to be coplanar with the support portion 22a. The support portion 22a is then pivoted to be coplanar with the connect portion 21a. The connect portion 21a is disengaged from the recessed portion 121a and pivoted from the display surface 101a toward the back 102a, and the copy stand 20a is received in the receiving slot 193a of the bracket 19a, whereby the bracket 19a and the copy stand 20a are disposed in fully folded position.

Figure 4A:
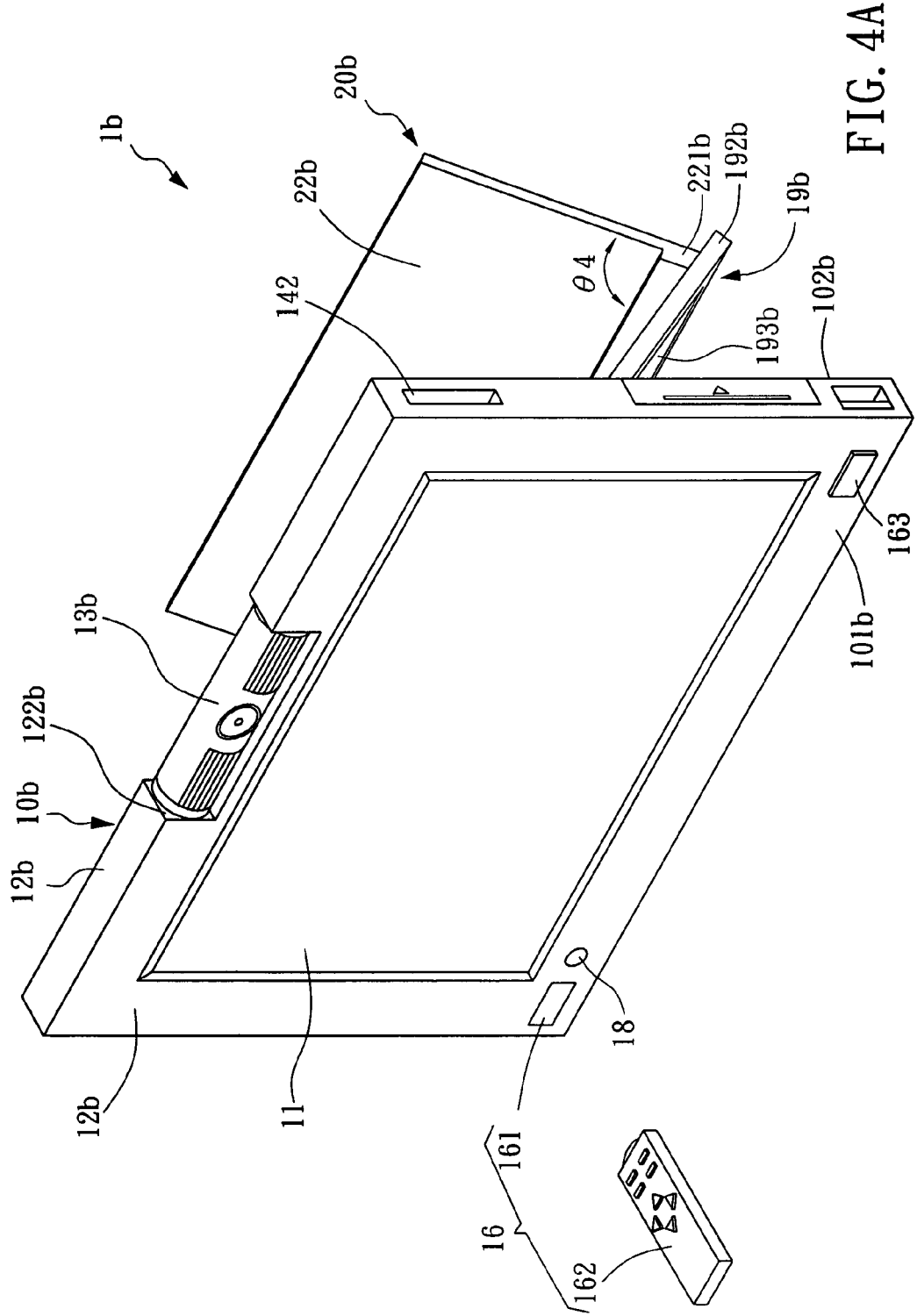
FIG. 4A is a front perspective view of a digital photo frame in accordance with a third preferred embodiment of the present invention.
Figure 4B:
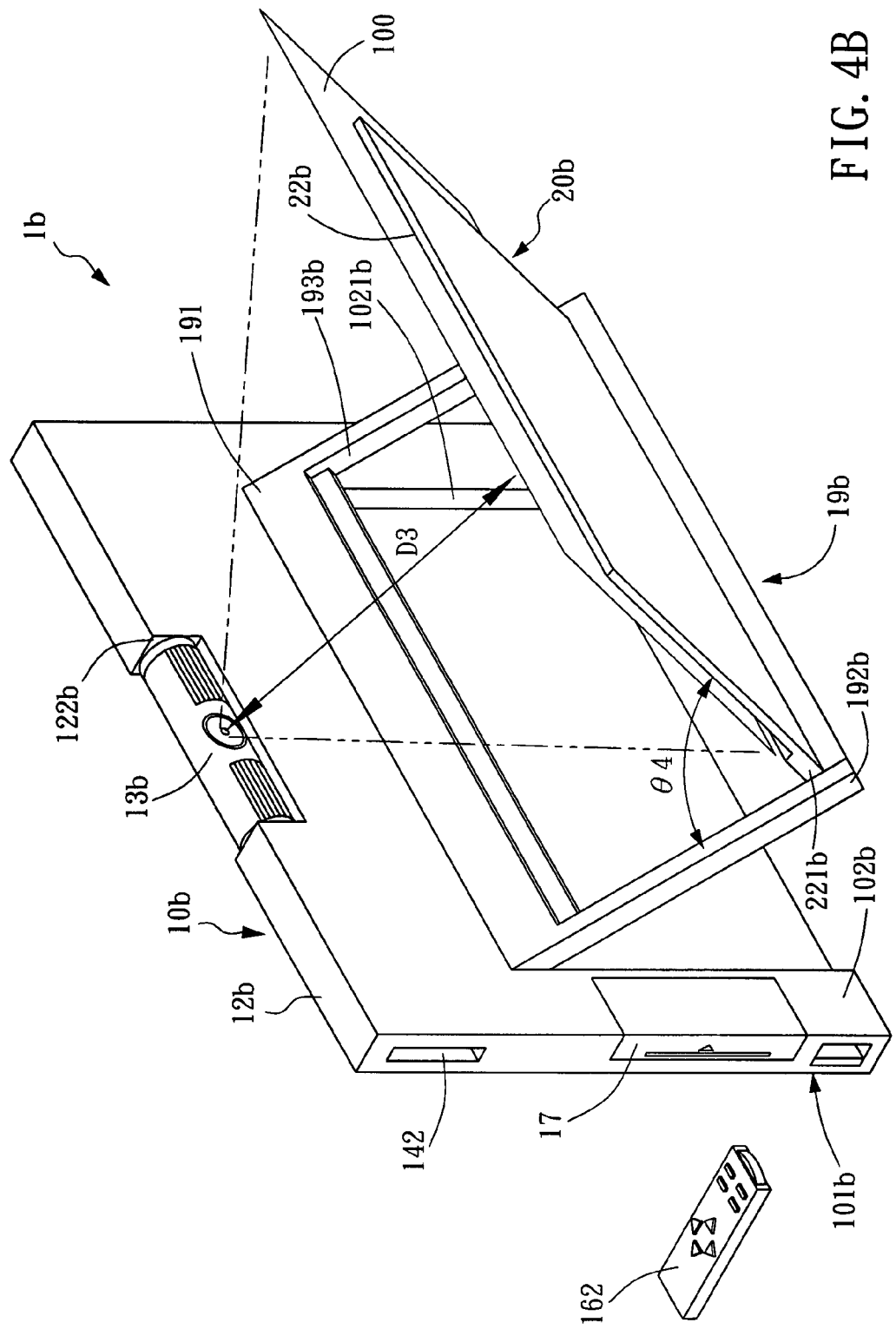
FIG. 4B is a side view of a digital photo frame in accordance with the third preferred embodiment of the present invention.

FIGS. 4A and 4B illustrate a front perspective view and a side view of a digital photo frame with photographing function in accordance with a third preferred embodiment of the invention, respectively. As shown in FIGS. 4A and 4B, the difference between the digital photo frame with photographing function of the third preferred embodiment and the first preferred embodiment is that, in the third preferred embodiment of the present invention, the lens module 13b of the digital frame 10b is disposed at a predetermined location on the frame 12b of the display surface 101b and is pivotally disposed in a lens module holder 122b on the frame 12b. The lens module 13b is pivoted in the lens module holder 122b from the display surface 101b toward the back 102b, such that both the display surface 101b and the back 102b can use the lens module 13b to take photograph, and various photograph angles are provided by this construction.

As shown in FIG. 4A, the lenses of the lens module 13b are disposed on the display surface 101b. In this case, the display module 11 can be used as a viewfinder for taking digital photographs and can be used to display the digital photographs taken thereon, such that when self-photographing, the user can view the position, size and clearness of his or her photographs from the display module 11. Further, the remote controller 162 can input control signals to the corresponding wireless receiving module 161, thereby controlling the lens module 13b to perform zoom-in or zoom-out photographing, or perform playback function via the display module.

As shown in FIG. 4B, when the lenses of the lens module 13b are pivoted to the back 102b, the display module 11 can be used as a viewfinder for taking digital photograph. The copy stand 20b, to which the bracket 19b is pivotally connected, is pivoted about the unfold portion 192b, to which the turning end 221b is pivotally connected, and turned outward for a preset angle θ4 with respect to the bracket 19b so that the copy stand 20b is spaced from the lens module 13b with a preset distance D3. The paper photo 100 then can be disposed on the support portion 22b for the lens module 13b to copy photograph, thereby achieving quick and readily copy photograph of the paper photo into digital photo files. In this embodiment, the preset distance D3 and preset angle θ4 are selected such that the paper photo 100 supported on the support portion 22b is positioned at the very location that enables the lens module 13b to take clear photograph of the photo 100.

Figure 4C:
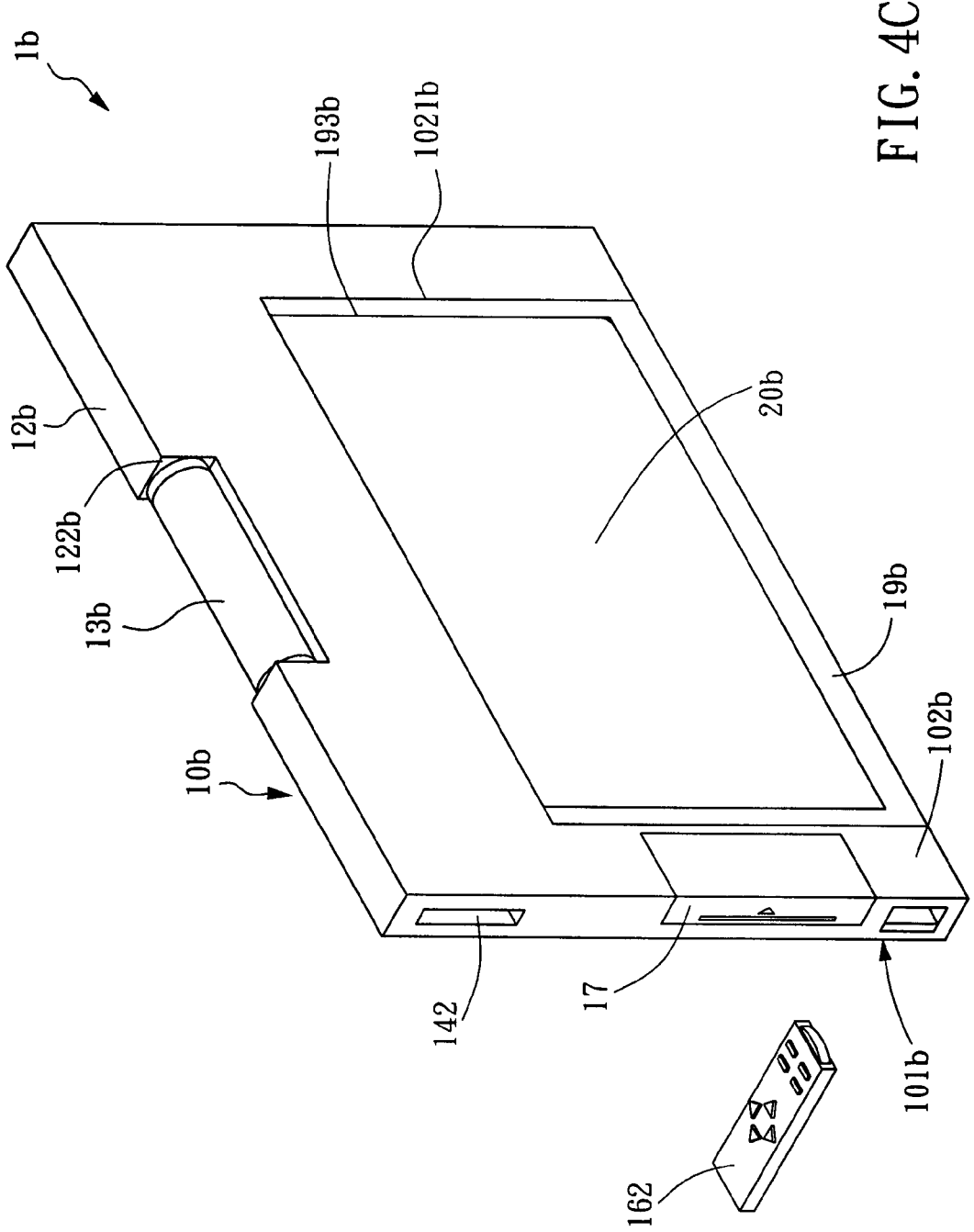
FIG. 4C is a folded position of the bracket of the digital photo frame of the third preferred embodiment of the present invention.

FIG. 4C illustrates a folded position of the bracket of the digital photo frame with photographing function of the third preferred embodiment of the present invention. As shown in FIG. 4C, the bracket 19b of the digital photo frame 1b is pivotally connected with the copy stand 20b. In the folded position, the copy stand 20b may be received in the receiving slot 193b to be coplanar with the bracket 19b. In addition, the bracket 19b and the copy stand 20b can retract into a recess 1021b preformed in the back 102b, thus reducing the size of the digital photo frame 10b for storage.

In summary, the digital photo frame 1 of the present invention includes a digital frame 10, a lens module 13, a bracket 19, and a copy stand 20. The digital frame 10 may further include a display module 11, a frame 12, a memory module 14, a control module 15, an input module 16, a power supply module 17, and a sense module 18. The input module 16 may further include a wireless receiving module 161 and a remote controller 162.

The display module 11 is enclosed by and fixed within the frame 12. The lens module 13 is disposed at a predetermined location on the frame 12. The input module 16 inputs control signals, and the control module 15 operates and controls the lens module 13 to take photographs. The display module 11 is used as a viewfinder for taking digital photographs and is used to display the photograph taken on the display module 11, making it possible to take self-photograph and display the photograph directly on the digital frame 10, and to store a plurality of digital photographs taken in the memory module 14 for playback in the display module 11.

Further, a paper photo 100 can be disposed on the copy stand 20 that is pivotally connected to the bracket 19 to be copy photographed into a digital photo by the lens module 13, thus facilitating the self-photographing and achieving copy photograph function. The remote controller 162 can input control signals, and the wireless receiving module 161 can receive the control signals to operate and control the control module 15 to change the digital photographs being displayed on the display module 11, thus allowing the user to freely change the digital photographs being displayed on the display module 11.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A digital photo frame with photographing function, comprising:
   a digital frame configured to display a digital photo; and
   a lens module disposed at a predetermined location on the digital frame;
   wherein the lens module is configured to take digital photos with the digital frame being used as a viewfinder;
   a bracket comprising a pivot end, an unfold portion, and a receiving slot, the bracket being coupled to the digital frame at the pivot end, and being pivotal about the pivot end outward a preset angle with respect to the digital frame to support the digital frame; and
   a copy stand pivotally connected to the unfold portion of the bracket such that that copy stand can be foldable into the receiving slot to be coplanar with the bracket and can be pivoted about the unfold portion to face the lens module with a preset angle formed between the copy stand and the bracket and with a preset distance formed between the copy stand and the lens module, wherein the copy stand is configured for receiving at least one photo allowing the lens module to copy photograph the photo into a digital photo;
   wherein the copy stand further comprises:
   a connect portion comprising a first turning end, a second turning end, a slot, and an extension end, the first turning end being pivotally connected to the unfold portion of the bracket; and
   a support portion comprising a turning end and a pivot arm, in which the turning end of the support portion is pivotally connected to the second turning end of the connect portion and is pivotal about the second turning end for a preset angle with respect to the connect portion;
   wherein the extension end can be pulled out of the slot of the connect portion so that the support portion and the lens module face each other and are spaced from each other for a preset distance and the pivot arm is configured for receiving a photo allowing the lens module to copy photograph the photo into a digital photo.

2. The digital photo frame in accordance with claim 1, further comprising:
   a display module configured to output the digital photo;
   a frame framing the display module therein;
   a memory module configured to store the digital photo taken by the lens module and supply the display module with digital photos for playback;
   a control module configured to control the display module to display the digital photos and the lens module to take photographs;
   an input module disposed at a predetermined location on the frame and being configured to input a control signal to operate the control module; and
   a power supply module configured to supply needed power to the digital frame.

3. The digital photo frame in accordance with claim 1, wherein the lens module comprises a plurality of lenses and an image sensor unit, in which the lens module is pivotally disposed in a lens module holder of the digital frame to provide photographs at different angles, and the digital frame further comprises a sense module connected to the control module to sense an ambient environment to enable the control module to automatically control turning on or turn off of the power supply module, wherein the sense module employs one of light detection, audio detection, temperature detection, and infrared scan detection.

4. The digital photo frame in accordance with claim 1, wherein the bracket and the copy stand are pivotally connected with each other, so that in a folded position, the bracket and copy stand are folded to be coplanar with each other and retract into a recess of the digital frame.

5. The digital photo frame in accordance with claim 2, wherein the input module further comprises a wireless receiving module and a remote controller, in which the wireless receiving module is configured to receive a control signal from the remote controller for controlling the control module to operate, and the wireless receiving module is one of an RF module and an infrared module.

6. The digital photo frame in accordance with claim 2, wherein the display module is a liquid crystal display, and the power supply module connects through one of a USB interface and a transformer to an outer power source to get recharged.

7. The digital photo frame in accordance with claim 2, wherein the memory module further comprises a memory and a memory card reader.

8. The digital photo frame in accordance with claim 1, wherein the connect portion is pivotal about the unfold portion to which the first turning end is pivotally connected to extend across a recessed portion of the frame.

9. A digital photo frame with photographing function, comprising:
a digital frame configured to display a digital photo;
a lens module disposed at a predetermined location on the digital frame;
a bracket comprising a pivot end, an unfold portion and a receiving slot, the bracket being coupled to the digital frame at the pivot end, and being pivotal about the pivot end outward a preset angle with respect to the digital frame to support the digital frame; and
a copy stand pivotally connected to the unfold portion of the bracket such that that copy stand can be foldable into the receiving slot to be coplanar with the bracket and can be pivoted about the unfold portion to face the lens module with a preset angle formed between the copy stand and the bracket and with a preset distance formed between the copy stand and the lens module, wherein the copy stand is configured for receiving at least one photo allowing the lens module to copy photograph the photo into a digital photo;
wherein the copy stand further comprises:
a connect portion comprising a first turning end, a second turning end, a slot, and an extension end, the first turning end being pivotally connected to the unfold portion of the bracket; and
a support portion comprising a turning end and a pivot arm, in which the turning end of the support portion is pivotally connected to the second turning end of the connect portion and is pivotal about the second turning end for a preset angle with respect to the connect portion;
wherein the extension end can be pulled out of the slot of the connect portion so that the support portion and the lens module face each other and are spaced from each other for a preset distance and the pivot arm is configured for receiving a photo allowing the lens module to copy photograph the photo into a digital photo.

10. The digital photo frame in accordance with claim 9, further comprising:
a display module configured to output the digital photo;
a frame framing the display module therein;
a memory module configured to store the digital photo taken by the lens module and supply the display module with digital photos for playback;
a control module configured to control the display module to display the digital photos and the lens module to take photographs;
an input module disposed at a predetermined location on the frame and being configured to input a control signal to operate the control module; and
a power supply module configured to supply needed power to the digital frame.

11. The digital photo frame in accordance with claim 9, wherein the lens module comprises a plurality of lenses and an image sensor unit, in which the lens module is pivotally disposed in a lens module holder of the digital frame to provide photographs at different angles, and the digital frame further comprises a sense module connected to the control module to sense an ambient environment to enable the control module to automatically control turning on or turn off of the power supply module, wherein the sense module employs one of light detection, audio detection, temperature detection, and infrared scan detection.

12. The digital photo frame in accordance with claim 9, wherein the bracket and the copy stand are pivotally connected with each other, so that in a folded position, the bracket and copy stand are folded to be coplanar with each other and retract into a recess of the digital frame.

13. The digital photo frame in accordance with claim 10, wherein the input module further comprises a wireless receiving module and a remote controller, in which the wireless receiving module is configured to receive a control signal from the remote controller for controlling the control module to operate, and the wireless receiving module is one of an RF module and an infrared module.

14. The digital photo frame in accordance with claim 10, wherein the display module is a liquid crystal display, and the power supply module connects through one of a USB interface and a transformer to an outer power source to get recharged.

15. The digital photo frame in accordance with claim 10, wherein the memory module further comprises a memory and a memory card reader.

16. The digital photo frame in accordance with claim 9, wherein the connect portion is pivotal about the unfold portion to which the first turning end is pivotally connected to extend across a recessed portion of the frame.

\* \* \* \* \*